Dec. 23, 1941.    R. C. PIERCE ET AL    2,266,903
WIRE REEL
Filed Oct. 12, 1939    2 Sheets-Sheet 2

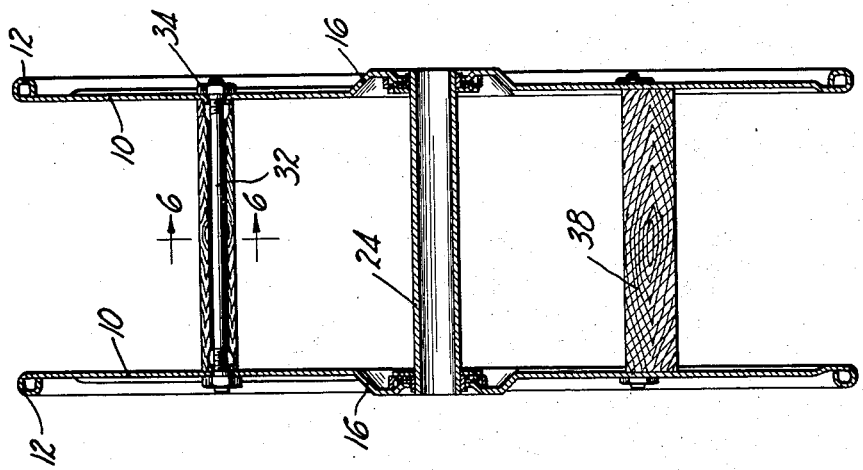
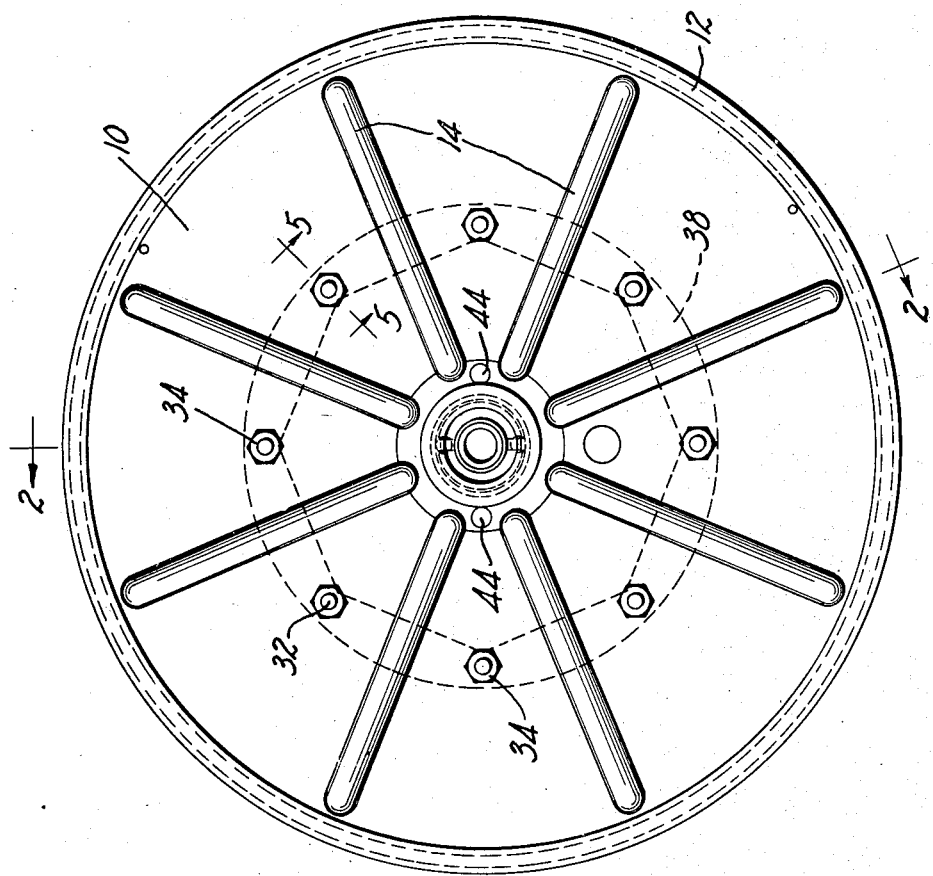

INVENTOR.
ROBERT C. PIERCE
LEONARD G. BERQUIST
BY Booth & MacDuff
ATTORNEYS.

Patented Dec. 23, 1941

2,266,903

UNITED STATES PATENT OFFICE 2,266,903

WIRE REEL

Robert C. Pierce and Leonard G. Berquist, Niles, Mich., assignors to National Standard Company, Niles, Mich., a corporation of Michigan Application October 12, 1939, Serial No. 299,068

5 Claims. (Cl. 242—77)

This invention relates to reels and more particularly to reels for storing and handling wire or the like.

In using wire reels the reel structure is likely to be damaged by bending, breaking, or the like during the various handling operations. Heretofore, when a reel became damaged it has been necessary to return it to the factory for repair. This is expensive and time consuming and it is accordingly one of the objects of the present invention to provide a reel which can easily be repaired at any place by the use of simple hand tools.

Another object of the invention is to provide a reel for wire or the like which may be easily and cheaply manufactured and assembled and which may be readily disassembled for repair or shipment.

The above and other objects and advantages of the invention will be apparent from the following description of the embodiment illustrated in the accompanying drawings, in which Figure 1 is an end view of a reel embodying the invention;

Figure 2 is a section on the line 2—2 of Figure 1;

The illustrated reel comprises end plates 10 formed of pressed steel or the like and formed with an outer bead 12 and with radial reinforcing corrugations 14. Each end plate at its central portion is formed with a pressed out hub portion 16 formed with a central opening.

Figure 3:
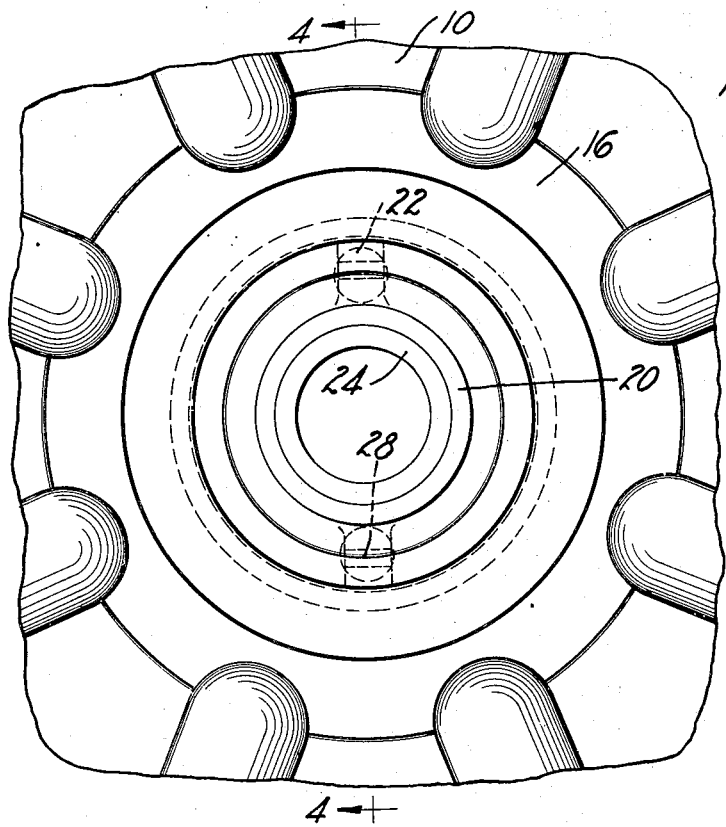
Figure 3 is an enlarged elevation of the hub portion of the reel.
Figure 4:
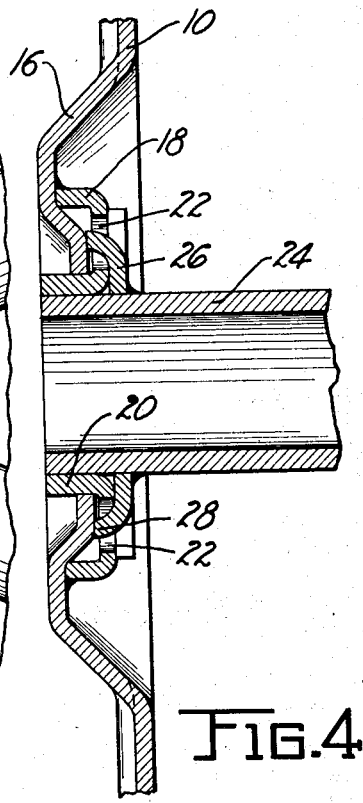
Figure 4 is a section on the line 4—4 of Figure 3.

As best seen in Figure 4, a U-shaped ring 18 is secured to the inner surface of the plate with one leg of its U-section extending through the central opening, as shown at 20. A pair of openings 22 are formed in the central portion of the ring 18 for a purpose to appear later.

The end plates are spaced apart by a tubular hub 24 extending through the leg portions 20 at its ends and bearing thereagainst. An annular flange 26 is welded or otherwise secured to the hub 24 to limit inward movement of the end plates thereon, and a pair of lugs 28 are pressed out of the flange 26 and extend into the openings 22 to hold the plates and the hub against relative rotation.

Figures 5, 6:
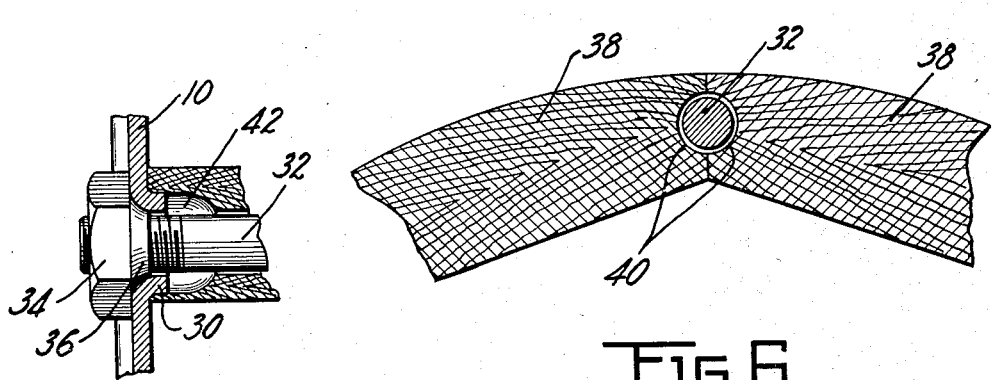
Figure 5 is an enlarged section on the line 5—5 of Figure 1.
Figure 6 is an enlarged section on the line 6—6 of Figure 6.

The end plates are formed radially outward of the center thereof with an annular series of flanged openings formed with inwardly turned flanges 30, as best seen in Figure 5. Tension fastening elements shown as bolts 32 extend through these openings and secure the end plates together, nuts 34 being screwed on to the ends of the bolts and formed with conical collars 36 fitting into the flanges 30.

In order to support wire or the like on the reel a plurality of arcuate blocks 38 are provided. These blocks may advantageously be formed of some hard wood such as maple and are preferably impregnated with linseed oil to act as a preservative. The blocks 38 are arranged edge to edge in annular array between the end plates 10, and are of such length that they abut against the end plates when the end plates are drawn up tightly against the flanges 26. The blocks 38 are held in position by frictional engagement of the ends with the end plates 10 and are formed at their adjoining edges with grooves 40 which fit around the tie bolts 32. Adjacent the ends of the blocks the grooves 40 are enlarged as shown at 42 in Figure 5 to fit around the inturned flanges 30 so that the flanges assist the bolts in locking the blocks and holding them in position.

If one or more of the blocks 38 should be damaged in use the tie bolt on one side of such damaged block may be removed and it may be replaced with a new block, thus any damage to this part of the reel may be easily and quickly repaired with only the use of a wrench to remove the nut 34. In assembling the reel the hub may be placed between the end plates and the blocks may be placed in position one at a time, the blocks so placed being held by the flanges 30 and by the tie bolts fitting into the grooves in the blocks until the assembly is completed.

In use on a machine in which wire is wound on the reel, suitable driving pins on the machine may be inserted in driving openings 44 in the end plates 10 to drive the reel. Ordinarily, a spindle is inserted in the tubular hub 24 and since the hub is prevented from rotating relative to the remainder of the reel by the lugs 28 and openings 22 the spindle itself may exert the necessary driving force.

While one embodiment of the invention has been shown and described in detail it will be understood that various changes might be made therein and it is not intended to limit the scope of the invention to the exact form shown nor otherwise than by the terms of the appended claims.

What is claimed is:

1. A reel for wire or the like comprising a pair of end plates, a plurality of blocks lying edge to edge in annular array between said end plates and formed with arcuate outer surfaces to provide a cylindrical spool portion, the adjoining edges of said blocks being grooved, a hub extending through central openings in the end plates and having means to limit inward movement of the end plates axially of said hub, and tension fastenings extending from one end plate to the other through said grooves and holding the blocks in place and the end plates on the hub.

2. In a reel the combination with end plates of blocks having arcuate outer surfaces and arranged edge to edge in annular array between the end plates, said blocks having grooves in their adjoining edges, said end plates being formed with flanged openings the flanges of which fit into the ends of said grooves, and bolts extending through the flanged openings and the grooves.

3. In a reel, end plates formed with central openings, U-section rings secured to the inner faces of said plates with cylindrical portions extending through said openings, a tubular hub extending through said cylindrical portions, means on the hub engaging said rings to limit inward movement of the end plates thereon and to hold the hub and end plates against relative rotation, and tension means spaced radially from the hub to hold the end plates on the hub.

4. In a reel, end plates formed with central openings, a tubular hub extending through said openings, a U-shaped ring secured to the inner surface of each plate with one leg of the U-section extending through said opening to provide a bearing surface for the hub, a flange on the hub engaging said ring to limit inward movement of the plates on the hub, and cooperating means on the ring and flange to prevent relative rotation of the plates and hub.

5. A reel for wire or the like comprising a pair of end plates, a plurality of blocks lying edge to edge in annular array between said end plates, each of said blocks being formed in both of its edges with substantialy semi-circular grooves, the grooves of adjacent blocks cooperating when the blocks are assembled to provide elongated passages between the end plates with a portion of the passage in each block, and tension fastenings of substantially the same diameter as said passage extending from one end plate through said passages to the other end plate to hold the end plates and blocks in assembled relationship.

ROBERT C. PIERCE.
LEONARD G. BERQUIST.